Aug. 3, 1965 P. D. KIMBALL ETAL 3,198,657
PROCESS FOR SPIN COATING OBJECTS
Filed Sept. 17, 1964
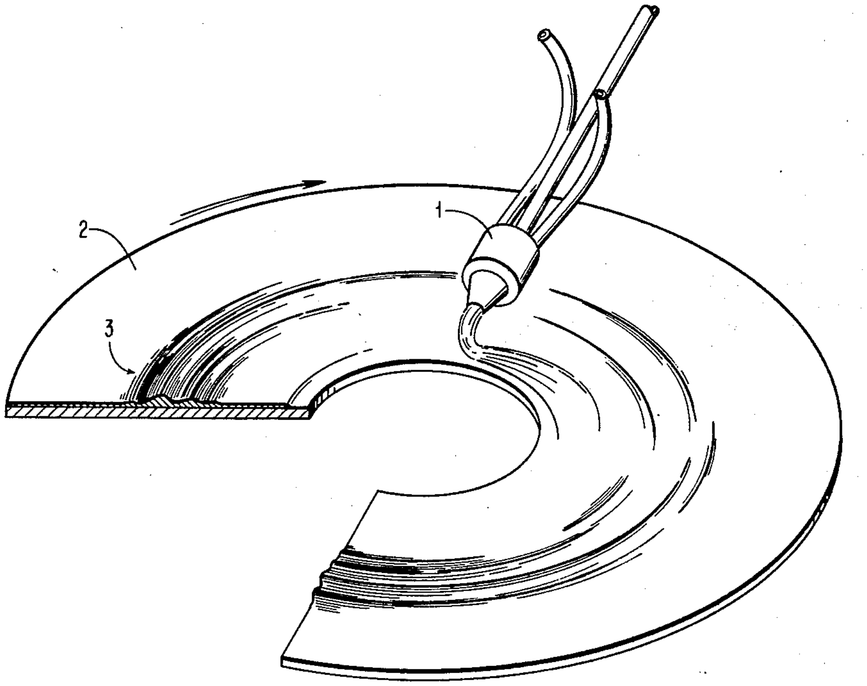
INVENTORS.
PHILIP D. KIMBALL
EUGENE R. BLOME
BY Joseph C. Herring
ATTORNEY

United States Patent Office 3,198,657
Patented Aug. 3, 1965

3,198,657

PROCESS FOR SPIN COATING OBJECTS

Philip D. Kimball and Eugene R. Blome, San Jose, Calif., assignors to International Business Machines Corporation, New York, N.Y., a corporation of New York Filed Sept. 17, 1964, Ser. No. 398,478
14 Claims. (Cl. 117—101)

This application is a continuation-in-part of co-pending U.S. Patent application Serial No. 145,275, filed October 16, 1961, now abandoned.

This invention relates to a process for spin coating objects, and more particularly, to a process for spin coating objects with a pigmented material.

Spin coating is well known and essentially comprises pouring a liquid coating material on the center or inner edge of a rapidly spinning object, and allowing centrifugal force to evenly spread the coating material over the object. This process is simple and effective for most purposes, even when the thickness of the coating is as thin as one mil.

In the earlier production models of rotating storage devices where relatively wide bit spacing could be tolerated, i.e., 500 bits per inch, disks having ferromagnetic coatings of one mil thickness have proven satisfactory. However, with increased demands for high bit density storage, i.e., 1,000 bits and above per inch, the normal ferromagnetic coating of one mil thickness was found to be unsatisfactory. This objection appears to be primarily due to random or stray fields from the recorded bits passing through the coating which interfere or overlap with the closely spaced bit positions. It was further determined that in order to decrease the stray fields and thus permit increased bit recording density thinner magnetic coatings were necessary. Thus, the requirements were changed to call for coated disks having magnetic oxide thicknesses of less than one mil, i.e.—one-half to one-quarter mil.

In attempting to meet the increased bit density demands, using the known coating processes, it was found that with disks coated at these reduced thicknesses radial striations appeared on the disk surface. These striations adversely affect the magnetic qualities of the coatings so as to make the resulting disks commercially useless. Another problem, called "orange peel" because of its appearance, is aggravated at these reduced coating thicknesses. These striations and "orange peel" defects produce additional surface roughness and further impedes the travel of the air bearing gliding heads over the surfaces of the disk.

It is therefore an object of the present invention to provide a spin coating process for applying coatings of less than one mil thickness without surface imperfections.

It is another object of the invention to provide an improved spin coating process for applying a magnetic coating which is capable of high bit density storage and yet which is essentially free of radial striations and other surface imperfections.

In order to achieve the above objects, the surface to be spin coated is first wetted by pouring the material to be coated on the spinning surface from the outer edge to the inner edge of the surface. Then, the pouring of this coating material on the spinning surface is continued using conventional spin coating techniques. That is, the pouring may be continued at the inner edge until an amount of material in excess of the amount necessary to cover the surface has been poured and then pouring at the inner edge is discontinued. Or, the coating material may be continued at the inner edge only until a wave front of material is flowing outward over the spinning surface. Then, the material is poured from the inner edge to the outer edge either by pouring behind the moving wave front or by pouring over and in front of the wave front. At the outer edge of the surface, pouring is discontinued. Following both of the above techniques the coated surface is treated to the usual centrifugation and curing.

With this improved spin coating process having its unique wetting step, it was found that disks could be coated with a magnetic layer within the required one-half to one-quarter mil thickness and without radial striations and other surface imperfections to thereby permit satisfactory recording at high bit densities of 1000 bits and above.

The foregoing and other objects, features and advantages of the invention will be apparent from the following more particular description of preferred embodiments of the invention, as illustrated in the accompanying drawing.

The single figure illustrates a fragmentary view of a rotating disk being coated with material from a nozzle positioned adjacent the inner edge of the disk.

Referring now to the drawing for a better understanding of the process of the invention, there is shown a disk 2 spinning or rotating in a clockwise direction as indicated by the curved arrow. Disposed above the spinning disk 2 is a nozzle 1 which is reciprocatable or oscillatable in a plane parallel to the surface 5 of the disk so as to be movable between the inner and outer edges of the disk without contacting the surface thereof. As shown, the nozzle 1, while pouring, has been moved inwardly from the outer edge of the disk 2 and the unique wetting step of the present invention has been completed. The rate of inward movement by the nozzle and the flow of coating material are such to substantially wet or cover the entire surface of the spinning disk. At this innermost travel of the nozzle, the pouring of the coating material has been continued so that an annular flow line or wave front 3 of coating material has formed.

Preferably, the nozzle 1, while still pouring, is moved back to the outer edge of the disk 2. With this preferred technique, the wave front is allowed to travel from about one-fifth to about one-half of the distance between the inner and outer edges before the nozzle 1 is moved back to the outer edge of the disk. While normally the rate of the nozzle movement on its return to the outer edge is such that the material being poured does not disturb the wave front 3, this is not required. Rather, the rate of movement of the nozzle may be such that the material being poured passes over the wave front 3 and is poured in front of the wave front.

In the alternative, the nozzle 1 is not moved back to the outer edge, but continues to pour at the inner edge until the amount of coating material being discharged from the nozzle is in excess of the amount necessary to completely cover the surface of the disk. Normally, this is when the wave front 3 has passed the halfway mark between the inner and outer edges. Then, pouring is stopped.

After the disk has been coated by the unique wetting step plus either the preferred technique or the alternate technique, the disk undergoes centrifugation at elevated temperatures so as to remove any excess material and to smooth the surface of the coated layer. While the particular r.p.m. and temperature will vary with the size of coated surface and the specific coating material, 200 r.p.m. at about 150° C. for two minutes was found suitable for 24 inch disk and a coating material consisting of an epoxy-phenolic resin and ferromagnetic particles and having a Zahn No. 3 cup viscosity of 24 seconds. Because discharge from the nozzle 1 cannot be stopped instantaneously, there are drippings at the inner edge of the disk when the alternate technique is used. Therefore, it is desirable to centrifuge the coated disk at a higher r.p.m., such as about 400 r.p.m., than is used when the preferred technique is employed.

After this heated centrifugation, the disk is cooled and the coated material is cured. By "cured" is meant that the coated layer is solidified and hardened. The particular method employed will depend on the material used. If the material is a thermosetting resin, curing consists of baking the coated layer for a period of time to bring about cross-linking. For example, when the layer comprises an epoxy-phenol resin, baking at 210° C. for two hours is sufficient to cure the resin. If a thermoplastic resin is used, curing is brought about by removing the solvent or drying. This may be accomplished by either known heating or vacuum techniques. Other materials comprising a suspension of finely-ground particles in a vehicle and are capable of adhering to a surface can be cured by removing the vehicle or drying.

As indicated above, the present invention is not limited to a specific coating material or a specific substrate material. The coating material may be any of a variety of known flowable materials capable of adhering to the substrate surface and being solidified thereon by, for example, curing or drying. Examples are synthetic resins which include thermosetting resins, such as epoxy-based resins, polyurethanes, alkyds, and urea-formaldehyde resins and thermoplastic resins, such as polystyrene, polyvinyl chloride, and polyesters. These materials may serve as a vehicle for pigments and other particles. Both water and oil based paints are also contemplated by the present invention. The substrate can be any solid material having a surface to which the coating material will adhere. Examples of substrate materials are polyethylene terephthalate, aluminum, iron, brass, and glass to name a few. Because centrifugal force is the basis of the spin coating process, substrates having a substantially flat surface and outer edges substantially equidistant from the point of rotation (i.e.—a square or circular substrate) are best suited for the process of the present invention.

For fabricating the magnetic storage disk shown in the accompanying drawing, the substrate preferably is polished aluminum and the coating material is an epoxy-based resin having 0.5 to 1.5 micron ferromagnetic particles dispersed therein and with a Zahn No. 3 cup viscosity of between 18–24 seconds. While it is preferred to work with Zahn No. 3 cup viscosities of 18–24 seconds because the coating process is easier to control, coatings have been made with viscosities as low as 12 seconds.

It has been found that the thickness of the coated material is dependent on the viscosity of the material being coated and the speed of rotation of the substrate. That is, as the viscosity is increased, the speed of rotation must be increased or a thicker coating will result. Thus, in order to form a coating of a particular thickness, it is necessary to determine the viscosity and rotation speed which will achieve that thickness.

The following examples and comparison with the prior art will more fully illustrate the invention.

*Example I*

3000 grams of an epoxy-based coating was made up by mixing 870 grams of epoxy resin, having a melting point of 120–130° C. and an epoxide equivalent of 2000–5000 with 795 grams each of diacetone alcohol and xylene. A 300 gram portion of phenolic intermediate (an allyl ether or methylol phenol) was added to the epoxy resin mixture. A solution of 12 grams of methylphenylpolysiloxane resin, prepared by the general process of Example IV of U.S. Patent 2,258,222, was dissolved in a mixture of 30 grams each of diacetone alcohol and xylene. The solution was then added to the mixture of epoxy resin and phenolic intermediate. A solution of 24 grams of 85 percent phosphoric acid was formed with 72 grams of diacetone alcohol and 75 grams of xylene. The phosphoric acid was then mixed into the epoxy resin-phenolic resin mixture and the mixture allowed to age for several days in a glass container.

After completion of aging, 1182 grams of dried iron oxide powder having a particle size of about 0.2 to about 2.0$\mu$ was added to the resin mixture. The resulting conglomeration was milled for 72 hours in a ball mill having a capacity of about 18 qts. and containing 25 lbs. of one-half inch diameter porcelain balls. The mill was rotated at 48 r.p.m. After milling, the coating was paddled overnight and adjusted to Zahn No. 3 cup viscosity of 24 seconds with diacetone alcohol-xylene (50:50). Two disks having a diameter of 24 inches and having a hole in their center eight inches across were polished to a mirror finish. One disk was placed in a spin coating chamber and was spun at 200 r.p.m. The prepared magnetic oxide paint was poured onto the disk by a nozzle traveling inwardly across the disk at a rate of 60 inches per minute. The nozzle was held at the inner edge of the disk until the paint flow caused a visible wave front of paint to reach the mid-center point between the inner and outer edges of the disk. The pouring was continued as the nozzle returned to beyond the outside edge of the disk. At the outer edge, pouring from the nozzle was stopped. Then, spinning was continued at 200 r.p.m. while the disk was heated to about 149° C. for about two minutes within the coating chamber. After cooling, the disk was removed from the chamber, cured by baking at about 210° C. for two hours, and found to have a coating of about 0.5 mil thick with no radial striations.

The other disk was placed in the spin coating chamber and spun at 200 r.p.m. Again, the prepared magnetic oxide paint was poured onto the disk by a nozzle traveling inwardly across the disk at a rate of 60 inches per minute. The nozzle was held at the inner edge of the disk until the paint flow caused a visible wave front of paint to pass beyond the mid-center point between the inner and outer edges of the disk. Then, the pouring of the paint from the nozzle at the inner edge of the disk was stopped. The disk continued to be spun at 200 r.p.m. until the excess paint had passed over the outer edge. The disk then was heated to about 149° C. and spun at about 400 r.p.m. for about two minutes within the coating chamber. After cooling, the disk was removed from the chamber, cured by baking at about 210° C. for two hours and found to have a coating of about 0.65 mil thick with no radial striations.

*Example II (prior art)*

The procedure of Example I was followed with the exception that the ferromagnetic coating material or paint was not poured from the nozzle during its inward movement. That is, the conventional or prior art spin coating process was practiced. The nozzle was positioned and held at the inner edge of the disk, after which the nozzle was opened and held while the paint poured on the disk until the paint flow line or wave front had reached the midpoint between the inner and outer edges of the disk. Pouring was continued as the nozzle traversed toward the outer edge of the disk at a speed such that the paint flow from the nozzle did not cross the radially moving flow line.

Disks coated by the process in Example II were found to have an average of about fifty radial striations per inch circumferentially in all radial positions. These defects cause noise or generate spurious signals in the magnetic surface which, of course, tend to be detected as data signals to a magnetic transducer. Disks with these defects are not useful because of the size and frequency of occurrence of the spirous signals.

As can be seen from the above two examples, the quality of the magnetic coating on the disks for higher density recording varies widely between the two processes.

While the materials and operating conditions were the same in each instance, with the prior art process of Example II of coating the surface of the disk by initiating the coating process from the inner edge, it was not possible to produce magnetic coated disks which would pass the higher density recording requirements. With the improved process of first wetting the disk surface by pouring ferromagnetic paint on the surface from the outer edge to the inner edge prior to adding the same ferromagnetic paint from the inner edge to the outer edge, a far superior product was produced. In fact, the disclosed process provides an improved ferromagnetic coated disk which not only meets the higher density recording requirements, but these higher standards have been met with no or very little increase in manufacturing cost.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a process for spin coating objects, the steps comprising:
   pouring a synthetic resin paint on a spinning object to be coated from its outer edge to its inner edge,
   continuing pouring the paint on the inner edge until a wave front of paint forms ahead of the point of impact of the poured paint, and
   pouring the paint from the inner edge to the outer edge of the object at a rate such that the paint being poured does not disturb the formed wave front of paint.

2. In a process for spin coating magnetic recording disks, the steps comprising:
   pouring a synthetic resin paint containing a magnetizable pigment on a spinning disk from its outer edge to its inner edge,
   continuing to pour the paint on the inner edge until a wave front of paint forms ahead of the point of impact of the poured paint, and
   pouring the paint from the inner edge to the outer edge of the disk at a rate such that the paint being poured does not disturb the formed wave front of paint.

3. The process of claim 2 wherein the wave front of paint travels from about one-fifth to four-fifths the distance from the outer edge of the disk.

4. The process of claim 2 wherein the wave front of paint travels from about one-fifth to one-half of the distance from the inner edge to the outer edge of the disk.

5. The process of claim 2 wherein the wave front of paint travels about one-half of the distance between the inner edge and the outer edge of the disk.

6. In a process for spin coating magnetic recording elements, the steps comprising:
   pouring an epoxy resin based paint containing a magnetizable pigment on a spinning magnetic recording substrate, spinning at about 200 r.p.m from the outer edge to the inner edge of the substrate at a travel rate of about 60 inches per minute,
   continuing to pour paint on the inner edge until a wave front of paint reaches about one-fifth to about one-half the distance between the inner edge and the outer edge, and
   pouring the paint from the inner edge to the outer edge at a travel of about 60 inches per minute at a rate such that the paint being poured does not disturb the formed wave front of paint.

7. The process of claim 6 wherein the wave front of paint is allowed to reach one-half the distance between the inner edge of the substrate and the outer edge prior to pouring paint from the inner edge to the outer edge at a rate such that the poured paint does not disturb the formed wave front of paint.

8. In a process of spin coating substrates, the steps comprising:
   wetting the surface of a substrate by pouring, from the outer edge to the inner edge of the substrate, a fluid coating material on the substrate surface while the substrate is spinning,
   pouring the coating material at the inner edge of the substrate until a wave front of coating material forms ahead of the point of impact of the poured material, and
   pouring the coating material from the inner edge to the outer edge of the substrate as the wave front travels radially toward the outer edge of the substrate.

9. In a process of coating a spinning substrate with a fluid coating material, the steps of:
   wetting the surface of the substrate by pouring the fluid coating material from the outer edge to the inner edge of the substrate, and
   continuing to pour the coating material at the inner edge to form, ahead of the point of impact, a wave front of the coating material which combines with and coats the wetted surface as it travels radially toward the outer edge of the substrate.

10. A process of coating a substrate by pouring a fluid coating material on the inner edge of the surface of the substrate while the substrate is spinning and allowing centrifugal force to spread the coating material over the substrate, characterized by:
   initially wetting the surface of the substrate with the coating material by pouring the coating material from the outer edge to the inner edge of the substrate.

11. In a process of coating a spinning substrate with a fluid coating material, the steps of:
   wetting the surface of the spinning substrate by pouring the fluid coating material from the outer edge to the inner edge of the substrate,
   continuing to pour the coating material at the inner edge to form, ahead of the point of impact, a wave front of the coating material which combines with and coats the wetted surface as it travels radially toward the outer edge of the substrate, and
   stopping the pouring of the coating material at the inner edge of the substrate when an amount of coating material in excess of the amount necessary to completely cover the surface of the substrate has been poured.

12. The process of claim 11 in which the pouring is stopped after the wave front of coating material passes over the midpoint between the inner and outer edges.

13. The process of claim 11 in which the coating material is an epoxy-based resin containing a magnetizable pigment and in which the substrate is a disk.

14. The process of claim 11 in which the last named step is followed by heating the coated substrate while spinning the substrate at a substantially higher speed than was used during coating.

No references cited.

RICHARD D. NEVIUS, *Primary Examiner.*